(12) United States Patent
Niu et al.

(10) Patent No.: US 9,473,515 B2
(45) Date of Patent: Oct. 18, 2016

(54) METHOD, DEVICE AND SYSTEM FOR SECURELY DOWNLOADING DATA

(71) Applicant: TENCENT TECHNOLOGY (SHENZHEN) COMPANY LIMITED, Shenzhen (CN)

(72) Inventors: Dongsheng Niu, Shenzhen (CN); Wanxin Wang, Shenzhen (CN); Li Kong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 138 days.

(21) Appl. No.: 14/312,441

(22) Filed: Jun. 23, 2014

(65) Prior Publication Data

US 2014/0380432 A1  Dec. 25, 2014

Related U.S. Application Data

(63) Continuation of application No. PCT/CN2013/090040, filed on Dec. 20, 2013.

(30) Foreign Application Priority Data

Jun. 19, 2013  (CN) .......................... 2013 1 0244553

(51) Int. Cl.
*H04L 29/06* (2006.01)
*G06F 21/62* (2013.01)

(52) U.S. Cl.
CPC ......... *H04L 63/126* (2013.01); *G06F 21/6272* (2013.01); *H04L 63/0281* (2013.01)

(58) Field of Classification Search
None
See application file for complete search history.

(56) References Cited

U.S. PATENT DOCUMENTS

| 6,088,803 | A | * | 7/2000 | Tso | ........... | G06F 21/564 |
| | | | | | | 709/203 |
| 2002/0178381 | A1 | * | 11/2002 | Lee | ........... | G06F 21/566 |
| | | | | | | 726/12 |
| 2003/0110258 | A1 | * | 6/2003 | Wolff | ........... | H04L 63/145 |
| | | | | | | 709/225 |
| 2003/0145228 | A1 | * | 7/2003 | Suuronen | ........... | H04L 63/0227 |
| | | | | | | 726/12 |
| 2007/0118903 | A1 | * | 5/2007 | Bates | ........... | G06F 21/56 |
| | | | | | | 726/22 |
| 2011/0030058 | A1 | * | 2/2011 | Ben-Itzhak | ........... | G06F 21/51 |
| | | | | | | 726/24 |
| 2011/0231517 | A1 | | 9/2011 | Srinivasan et al. | | |

FOREIGN PATENT DOCUMENTS

| CN | 101325533 A | 12/2008 |
| CN | 102255915 A | 11/2011 |

OTHER PUBLICATIONS

International Search Report received for PCT Patent Application No. PCT/CN2013/090040, mailed on Mar. 27, 2014, 3 pages.

* cited by examiner

*Primary Examiner* — Farid Homayounmehr
*Assistant Examiner* — Henry Tsang

(57) ABSTRACT

A method for data downloading is provided, including: sending a download request, and sending a security check request according to the download request; receiving network data returned according to the download request, and receiving a check result returned according to the security check request; and determining whether the check result indicates that the network data is secure; if yes, then continue receiving the returned network data, and if no, interrupt receiving the returned network data. In addition, a device and a system for data downloading are provided, which improve the security of data download.

19 Claims, 4 Drawing Sheets

METHOD, DEVICE AND SYSTEM FOR SECURELY DOWNLOADING DATA

CROSS REFERENCE TO RELATED APPLICATIONS

This application is a continuation application of the PCT International Application No. PCT/CN2013/090040, filed on Dec. 20, 2013, entitled "METHOD, DEVICE AND SYSTEM FOR DATA DOWNLOADING", which claims the priority from the Chinese patent application No. CN 201310244553.7, filed on Jun. 19, 2013. The above-referenced applications are hereby incorporated herein in their entireties by reference.

FIELD

The present disclosure relates generally to the field of data security, and more particularly to a method, device and system for data downloading.

BACKGROUND

With the development of network technology, accessing the network has become a part of people's lives. People are used to access the Internet via a browser installed in a mobile terminal, and download data from the Internet via the browser. For example, download text information from the Internet and store it in the mobile terminal; or, download installation package of applications from the Internet and install them in the mobile terminal.

However, it is found that the data from the network is not absolutely secure, and there may be a virus, which would be a security risk when downloaded to a terminal.

Therefore, heretofore unaddressed needs exist in the art to address the aforementioned deficiencies and inadequacies.

SUMMARY

To address the aforementioned deficiencies and inadequacies, there is a need to provide a method, device and system for data downloading, which can improve the security of data download.

According to one aspect of the disclosure, a method for data downloading includes: sending a download request, and sending a security check request according to the download request; receiving network data returned according to the download request, and receiving a check result returned according to the security check request; and determining whether the check result indicates that the network data is secure; if yes, then continue receiving the returned network data, and if no, interrupt receiving the returned network data.

According to another aspect of the disclosure, a device for data downloading includes: a sending module, configured to send a download request, and to send a security check request according to the download request; a receiving module, configured to receive network data returned according to the download request, and to receive a check result returned according to the security check request; and a determining module, configured to determine whether the check result indicates that the network data is secure. The device may continue receiving network data from the target server when it is determined that the check result indicates that the network data is secure. The device may interrupt the receiving of network data from the target server when it is determined that the check result indicates that the network data is insecure.

According to yet another aspect of the disclosure, a system for data downloading comprises a mobile terminal, a security server, and a target server. In the system, the mobile terminal is configured to send to the target server a download request, and to send to the security server a security check request according to the download request, and to receive from the target server network data according to the download request. The security server is configured to check the security of the network data according to the security check request to obtain a check result, and to return the check result to the mobile terminal. The mobile terminal is further configured to, when the check result indicates that the network data is secure, continue receiving network data returned from the target server, and when the check result indicates that the network data is insecure, interrupt receiving network data returned from the target server.

When downloading network data using the above-described method, device and system, a security check may be performed on the network data. If the network data is secure, then continue receiving network data returned according to the download request; and if the network data is insecure, the interrupt receiving network data returned according to the download request. This improves the security of data download.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
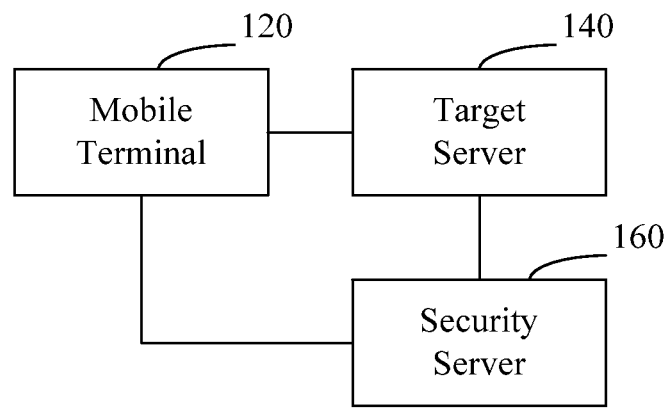
FIG. 1 is a schematic diagram showing a system for data downloading according to an embodiment of the present disclosure.

FIG. 1 is a schematic diagram showing a system for data downloading according to an embodiment of the present disclosure. The system for data downloading includes a mobile terminal 120, a target server 140, and a security server 160. The mobile terminal 120 can be a smart phone, tablet PC, e-book reader, laptop, etc. Network data can be downloaded from the target server 140 via a browser in the mobile terminal 120.

The interaction between components of the system is as follows.

(1a) The mobile terminal 120 is configured to send to the target server 140 a download request, to send to the security server 160 a security check request, and to receive network data returned from the target server 140 according to the download request.

Specifically, the security check request may contain a link address for downloading the network data. In some examples, the network data received by the mobile terminal 120 according to the download request may be a portion of a complete piece of network data, such as header portion of file data or other portion thereof.

In some examples, the received network data may be a complete piece of network data. When the received network data is detected to be insecure, then it may not be saved.

(1b) The security server 160 is configured to check the security of the network data according to the security check request to obtain a check result, and to return the check result to the mobile terminal 120.

The security server 160 may request the target server 140 for corresponding network data according to the link address for downloading contained in the security check request, and then check the security of the network data corresponding to the link address to obtain a check result. The check result can be that the network data is secure or insecure. Secure network data means that there is no virus in the network.

(1c) The mobile terminal 120 is further configured to, when it is determined that the check result indicates that the network data is secure, continue receiving network data returned from the target server 140 according to the download request, and when it is determined that the network data is insecure, interrupt receiving network data returned from the target server 140 according to the download request, and to send a prompt of whether to receive the returned network data.

The prompt may be text, picture or a combination thereof. The prompt can be displayed on the mobile terminal 120 in the form of a pop-up window, or in a browser window in the form of web content, or displayed in the form of a prompt bar. When displayed in the form of a pop-up window, its suggesting effect is more pronounced. On the other hand, when displayed in the form of a prompt bar, less data information would be needed to obtain through an asynchronous request, rather than sending a synchronization request to the security server. This saves the network resources.

When the mobile terminal 120 receives a user instruction of continuing receiving the returned network data triggered according to the prompt, it continues receiving the network data returned from the target server 140; when the mobile terminal 120 receives a user instruction of interrupting receiving the returned network data triggered according to the prompt, it interrupts receiving the network data returned from the target server 140.

When downloading, by a mobile terminal, network data from a target server using the above system, it is necessary to perform security check to the network data. If the network data is secure, then the mobile terminal continues receiving network data downloaded from the target server; and if the network data is insecure, then the mobile terminal interrupts receiving network data downloaded from the target server. This improves the security of data download.

Figure 2:
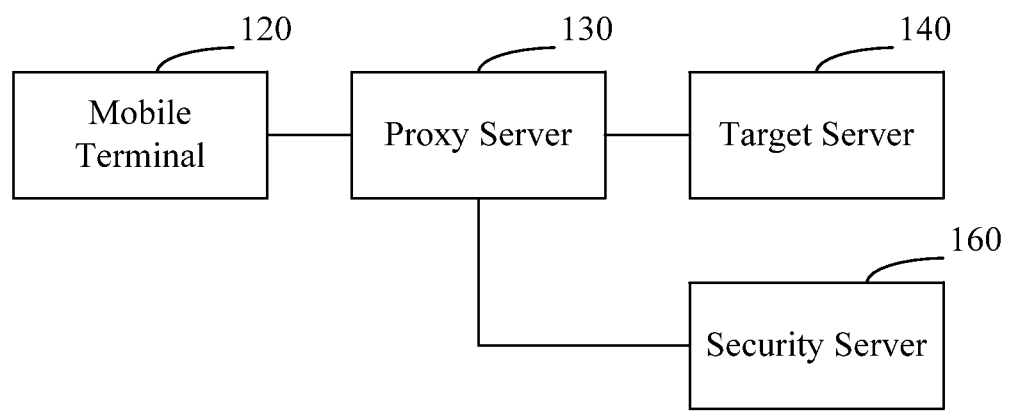
FIG. 2 is a schematic diagram showing a system for data downloading according to another embodiment of the present disclosure.

FIG. 2 is a schematic diagram showing a system for data downloading according to another embodiment of the present disclosure. The system includes, in addition to a mobile terminal 120, a target server 140 and a security server 160, a proxy server 130. The interaction between components of the system according to the embodiment is as follows.

(2a) The mobile terminal 120 is configured to send to the proxy server 130 a download request.

(2b) The proxy server 130 is configured to download network data from the target server 140 according to the download request, and to send to the security server 160, a security check request according to the download request.

(2c) The security server 160 is configured to check the security of the network data according to the security check request to obtain a check result, and to return the check result to the proxy server 130.

Specifically, the security check request may contain a link address for downloading the network data.

The security server 160 may request the target server 140 for corresponding network data according to the link address for downloading contained in the security check request, and then check the security of the network data corresponding to the link address to obtain a check result. The check result can be that the network data is secure or insecure. Secure network data means that there is no virus in the network.

(d) The proxy server 130 is further configured to send the check result to the mobile terminal 120.

(2e) The proxy server 130 is further configured to, when it is determined by the mobile terminal 120 that the check result indicates that the network data is secure, continue receiving network data returned from the target server 140 according to the download request, and when it is determined that the check result indicates that the network data is insecure, interrupt receiving network data returned from the target server 140 according to the download request, and to send to the mobile terminal a prompt of whether to receive the returned network data.

Specifically, the mobile terminal 120 is further configured to determine whether the content in a predetermined position of the check result packet indicates that the network data is secure. In the check result packet, the content in a predetermined position can be set as indicating whether the network data is secure, such as content set in the head or tail position of a packet indicating whether the network data is secure.

The prompt may be text, picture or a combination thereof. The prompt can be displayed on the mobile terminal 120 in the form of a pop-up window, or in a browser window in the form of web content, or displayed in the form of a prompt bar. When displayed in the form of a pop-up window, its suggesting effect is more pronounced. On the other hand, when displayed in the form of a prompt bar, less data information would be needed to obtain through an asynchronous request, rather than sending a synchronization request to the security server, which saves the network resources.

When the mobile terminal 120 receives a user instruction of continuing receiving the returned network data triggered according to the prompt, it continues receiving the network data returned from the target server 140; when the mobile terminal 120 receives a user instruction of interrupting receiving the returned network data triggered according to the prompt, it interrupts receiving the network data returned from the target server 140. When downloading, by a mobile terminal 120, network data from the target server 140 using the above system, it is necessary to download network data from the target server 140 firstly by the proxy server 130, and then initiate a security check request by the proxy server 130 to the security server 160. The security server 160 performs security check to the network data. If the network data is secure, then the proxy server 130 continues receiving network data returned from the target server 140; and if the network data is insecure, then the proxy server 130 interrupts receiving network data returned from the target server 140. The security risk of network data will be firstly assumed by the proxy server 130, which reduces the risk of insecurity on the mobile terminal 120, and improves the security of the data download.

In other embodiments, even if the above system includes the proxy server 130, it is also possible to send a security check request to the security server 160 at the same time of receiving by the proxy server 130 the network data corresponding to the download request. When the network data is secure, the proxy server 130 then receives the downloaded network data from the target server 140. In addition, if the network data requested by the download request exists in the proxy server 130, then directly check to see whether the network data in the proxy server 130 is secure, without the need to download from the target server 140. When it is secure, the network data is returned to the mobile terminal 120.

In other embodiments, the function of the proxy server 130 and the security server 160 may be performed by a computer, such that the mobile terminal 120 sends to the security server 160 a download request, and sends to the security server 160 a security check request according to the download request. The secure server 160 receives network data returned from the target server 140 according to the download request, and then performs security check to the network data and returns the check result to the mobile terminal 120. The mobile terminal 120 determines whether the check result indicates that the network data is secure; if yes, then the security server 160 continues receiving network data returned from the target server 140; and if no, then security server 160 interrupts receiving network data returned from the target server 140. The secure network data received by the security server 160 can then be returned to the mobile terminal 120. Thus, the security risk of network data will be firstly assumed by the security server 160, which reduces the risk of insecurity in the mobile terminal 120, and improves the security of the data download.

In addition, when the security server 160 finishes downloading the network data corresponding to the download request, or when the network data corresponding to the download request download request exists in the security server 160, the security server 160 will automatically detects the security of the network data, and returns directly to the mobile terminal 120 the network data when the network data is secure.

In other embodiments, the network data corresponding to the download request may be cached in the security server 160. Next time when the mobile terminal 120 requests to download the same network data, the security server 160 may directly perform security check to the network data to be downloaded, and return the check result more quickly, thus improving the check efficiency.

Figure 3:
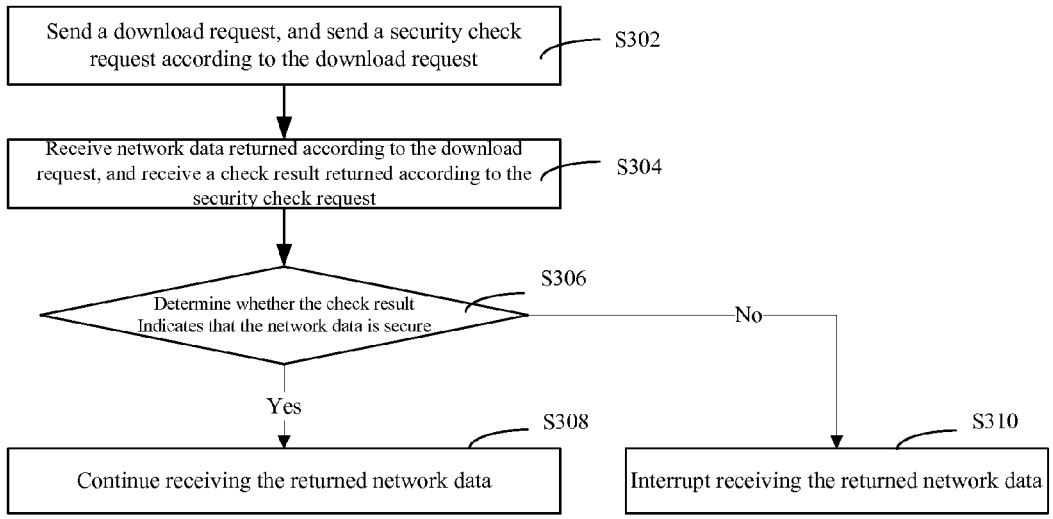
FIG. 3 is a diagram showing a method for data downloading according to an embodiment of the present disclosure.

FIG. 3 is a diagram showing a method for data downloading according to an embodiment of the present disclosure. The method can be applied to a mobile terminal, which can be a smart phone, tablet PC, e-book reader, laptop, etc.

The method includes the following steps.

Step S302, sending a download request, and sending a security check request according to the download request.

Specifically, open a browser in the mobile terminal 120, receive a trigger to the download link address in the browser, send a download request to the target server 140, and send a security check request to the security server 160 at the time of sending the download request. The security check request may contain a link address for downloading the network data.

Step S304, receiving network data returned according to the download request, and receiving a check result returned according to the security check request.

Specifically, the mobile terminal 120 receives a portion of the network data returned from the target server 140 according to the download request. The security server 160 requests the target server for network data corresponding to the link according to the security check request, and performs security check to the network data to obtain a corresponding check result. The check result can be that the network data is secure or insecure. Secure network data means that there is no virus in the network.

Step S306, determining whether the check result indicates that the network data is secure; if yes, then perform Step S308, and if no, then perform Step S310.

Step S308, continuing receiving the returned network data.

Step S310, interrupting receiving the returned network data.

The mobile terminal 120 determines whether the check result indicates that the network data is secure; if yes, then continue receiving network data returned from the target server 140 according to the download request; and if no, then interrupt receiving network data returned from the target server 140 according to the download request, and send a prompt of whether to receive the returned network data.

Determine whether the content in a predetermined position of the check result packet indicates that the network data is secure. In the check result packet, the content in a predetermined position can be set as indicating whether the network data is secure, such as content set in the head or tail position of a packet indicating whether the network data is secure. Using this way to determine the check result will be more convenient. The prompt may be text, picture or a combination thereof. The prompt can be displayed on the mobile terminal 120 in the form of a pop-up window, or in a browser window in the form of web content, or displayed in the form of a prompt bar. When displayed in the form of a pop-up window, its suggesting effect is more pronounced. On the other hand, when displayed in the form of a prompt bar, less data information would be needed to obtain through an asynchronous request, rather than sending a synchronization request to the security server, which saves the network resources.

Furthermore, the method includes, after the step of sending a prompt of whether to receive the returned network data, the step of: when receiving a user instruction of continuing receiving the returned network data triggered according to the prompt, continue receiving the network data returned from the target server; when receiving a user instruction of interrupting receiving the returned network data triggered according to the prompt, interrupt receiving the network data returned from the target server.

When downloading network data using the above method, it is necessary to perform security check to the network data. If the network data is secure, then continue receiving network data returned according to the download request; and if the network data is insecure, then interrupt receiving network data returned according to the download request.

This improves the security of data download. Upon the prompt, whether to receive the returned network data is determined based on the user selection, which is more flexible.

Figure 4:
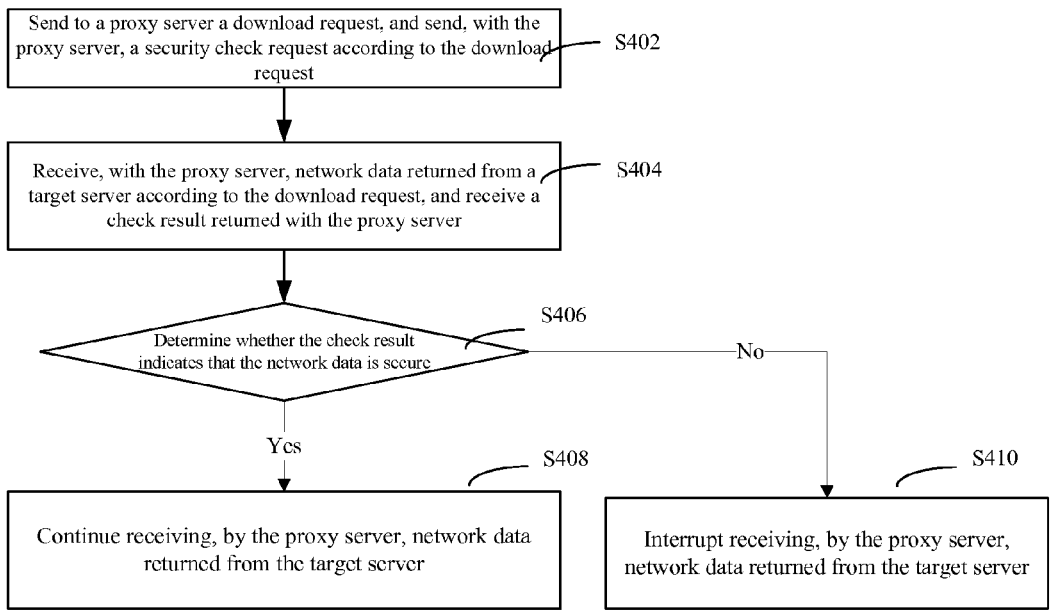
FIG. 4 is a diagram showing a method for data downloading according to another embodiment of the present disclosure.

FIG. 4 is a diagram showing a method for data downloading according to another embodiment of the present disclosure. The difference to the method in FIG. 3 lies in the use of a proxy server. That is, download the corresponding network data from a target server using a proxy server, then send a security check request to the security server by the proxy server in place of the mobile terminal, and then download network data from the proxy server by the mobile terminal. As a result, the risk of insecurity on the mobile terminal is reduced.

Step S402, sending to a proxy server 130 a download request, and sending by the proxy server a security check request according to the download request.

Specifically, the mobile terminal 120 sends a download request to the proxy server 130.

Step S402, receiving, by the proxy server 130, network data returned from the target server according to the download request, and receiving the check result returned by the proxy server 130.

The proxy server 130 downloads from the target server 140 a portion of the network data according to the download request, sends a security check request to the security server 160 according to the download request, and receives a check result, the result being obtained by checking the security of the network data according to the security check request, and returns the check result to the mobile terminal 120.

The security check request may contain a link address for downloading the network data.

The security server 160 may request the target server 140 for corresponding network data according to the link address for downloading contained in the security check request, and then check the security of the network data corresponding to the link address to obtain a check result. The check result can be that the network data is secure or insecure. Secure network data means that there is no virus in the network.

Step S406, determining whether the check result indicates that the network data is secure; if yes, then perform Step S408, and if no, then perform Step S410.

Specifically, the mobile terminal 120 is further configured to determine whether the content in a predetermined position of the check result packet indicates that the network data is secure. In the check result packet, the content in a predetermined position can be set as indicating whether the network data is secure, such as content set in the head or tail position of a packet indicating whether the network data is secure.

Step S408, continuing receiving, by the proxy server 130, network data returned from the target server 140 according to the download request.

Step S410, interrupting receiving, by the proxy server 130, network data returned from the target server 140 according to the download request.

In addition, the method further includes, after interrupting the receiving, the step of: sending a prompt of whether to receive the returned network data.

The prompt may be text, picture or a combination thereof. The prompt can be displayed on the mobile terminal 120 in the form of a pop-up window, or in a browser window in the form of web content, or displayed in the form of a prompt bar. When displayed in the form of a pop-up window, its suggesting effect is more pronounced. On the other hand, when displayed in the form of a prompt bar, less data information would be needed to obtain through an asynchronous request, rather than sending a synchronization request to the security server, which saves the network resources.

Furthermore, the method includes, after sending the prompt, the step of: when receiving a user instruction of continuing receiving the returned network data triggered according to the prompt, continue receiving the network data returned from the target serve; and when receiving a user instruction of interrupting receiving the returned network data triggered according to the prompt, interrupt receiving the network data returned from the target server.

Figure 5:
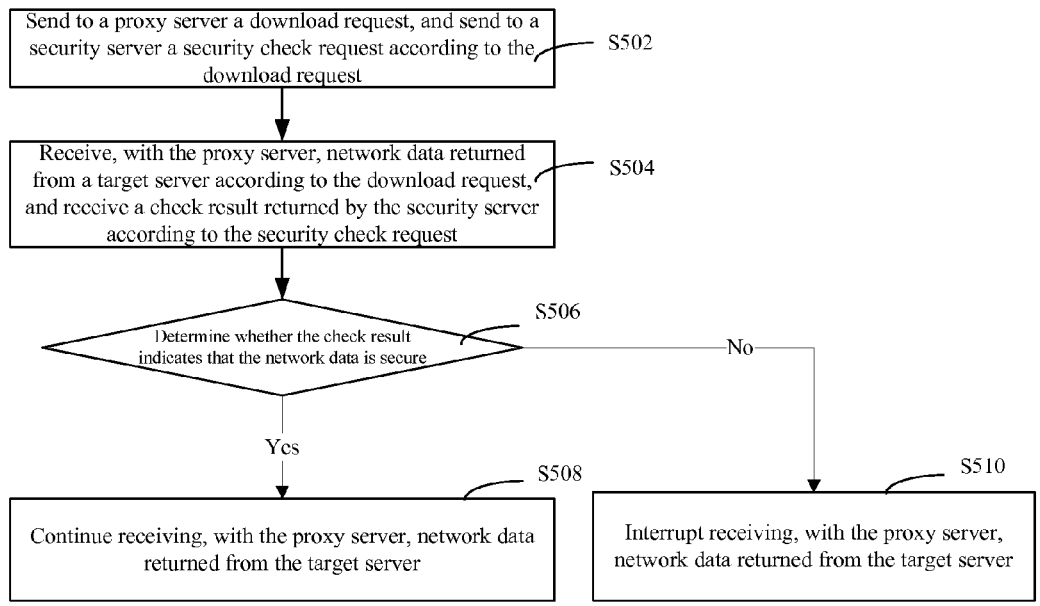
FIG. 5 is a diagram showing a method for data downloading according to another embodiment of the present disclosure.

FIG. 5 is a diagram showing a method for data downloading according to another embodiment of the present disclosure. The difference to the method in FIG. 4 lies in the use of a mobile terminal. That is, the download request and the security check request are all sent by a mobile terminal.

The method for data downloading includes the following steps.

Step S502, sending a download request to a proxy server 130, and sending a security check request to a security server 160 according to the download request.

Step S504, receiving, by the proxy server 130, network data returned from a target server 140 according to the download request, and receiving a check result returned by the security server 160 according to the security check request.

Specifically, the proxy server 130 firstly downloads from the target server 140 a portion of network data according to the download request; then mobile terminal 120 receives a check result returned by the security server 160 according to the security check request. The security check request may contain a link address for downloading the network data. The security server 160 may request the target server 140 for corresponding network data according to the link address for downloading contained in the security check request, and then check the security of the network data corresponding to the link address to obtain a check result. The check result can be that the network data is secure or insecure, and may be returned directly to a mobile terminal 120 without being forwarded by the proxy server. Secure network data means that there is no virus in the network.

Step S506, determining whether the check result indicates that the network data is secure; if yes, then perform Step S508, and if no, then perform Step S510.

Step S508, continuing receiving, by the proxy server 130, network data returned from the target server 140 according to the download request.

Step S510, interrupting receiving by the proxy server 130 network data returned from the target server 140 according to the download request.

In the above method, the download request is sent by the proxy server 130, and the network data is received also by the proxy server 130. This ensures the security of downloading network data by the mobile terminal 120. On the other hand, the security check request is sent by the mobile terminal 120, and the check result is returned by the security server 160 directly to the mobile terminal. This reduces the intermediate transit links, saving time and network resources.

Figure 6:
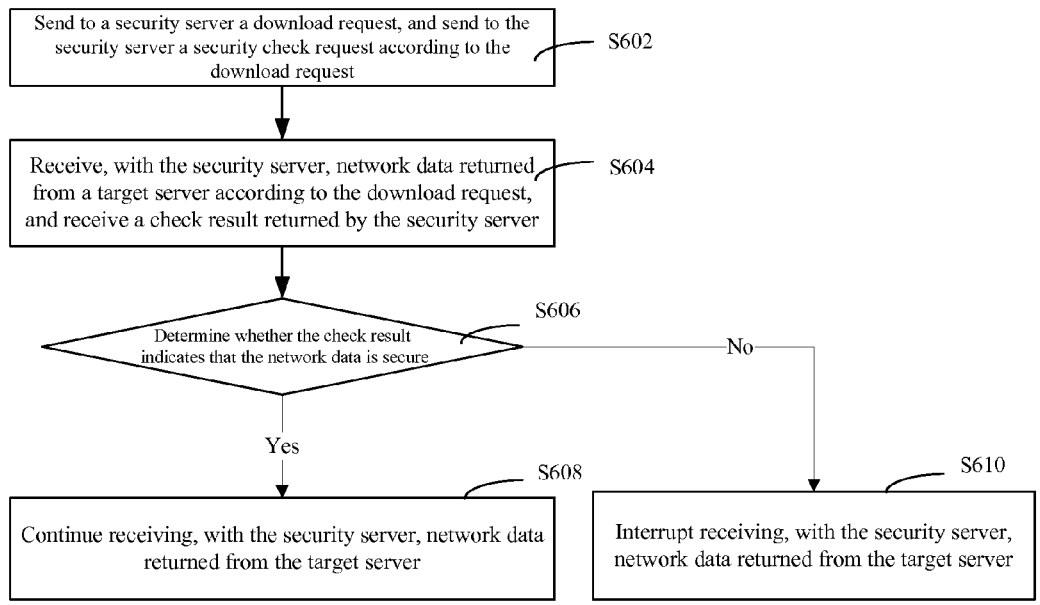
FIG. 6 is a diagram showing a method for data downloading according to another embodiment of the present disclosure.

FIG. 6 is a diagram showing a method for data downloading according to another embodiment of the present disclosure. The difference to the method in FIG. 4 lies in that the mobile terminal sends to the security server the download request and the security check request.

The method for data downloading includes the following steps.

Step S602, sending a download request to a proxy server 130, and sending a security check request to a security server 160 according to the download request.

Step S604, receiving, by the security server 160, network data returned from a target server 140 according to the download request, and receiving a check result returned by the security server 160 according to the security check request.

Specifically, the security server 160 receives network data returned from the target server 140 according to the download request, the network data being a portion of a complete piece of network data. The security check request may include a link address for downloading the network data. The security server 160 may request the target server 140 for corresponding network data according to the link address for downloading contained in the security check request, and then check the security of the network data corresponding to the link address to obtain a check result. The check result can be that the network data is secure or insecure. Secure network data means that there is no virus in the network. Secure network data means that there is no virus in the network. The function of the security server 160 and the proxy server 130 is performed by the security server 160, which saves the hardware and reduces the cost thereby.

In addition, when the security server 160 finishes downloading the network data corresponding to the download request, or when the network data corresponding to the download request download request exists in the security server 160, the security server 160 will automatically detects the security of the network data, and returns directly to the mobile terminal 120 the network data when the network data is secure.

Step S606, determining whether the check result indicates that the network data is secure; if yes, then perform Step S608, and if no, then perform Step S610.

Step S608, continuing receiving, by the security server 160, network data returned from the target server 140 according to the download request.

Step S610, interrupting receiving by the security server 160 network data returned from the target server 140 according to the download request.

In addition, the method further includes, after interrupting the receiving, the step of: sending a prompt of whether to receive the returned network data.

In the above method, the download request is sent by the security server 160, and the network data is received also by the security server 160. This ensures the security of downloading network data by the mobile terminal 120.

In the embodiments of FIG. 4, FIG. 5 and FIG. 6, the respective method includes, after the step of sending a prompt, the step of: when receiving a user instruction of continuing receiving the returned network data triggered according to the prompt, continue receiving the returned network data; when receiving a user instruction of interrupting receiving the returned network data triggered according to the prompt, interrupt receiving the returned network data.

In other embodiments, the network data corresponding to the download request may be cached in the security server 160. Next time when the mobile terminal 120 requests to download the same network data, the security server 160 may directly perform security check to the network data to be downloaded, and return the check result more quickly, thus improving the check efficiency.

Figure 7:
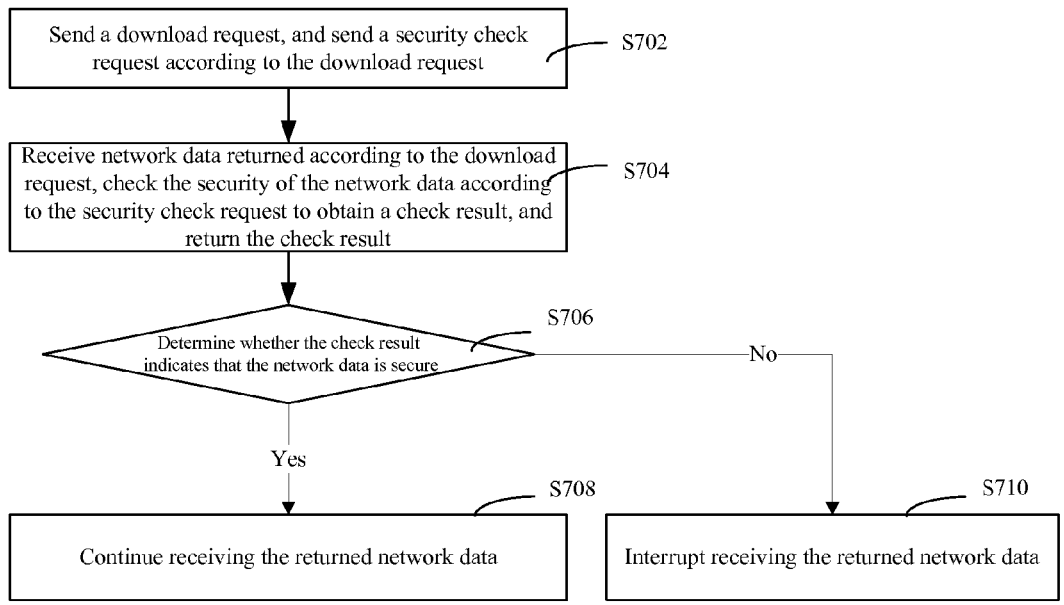
FIG. 7 is a diagram showing a method for data downloading according to another embodiment of the present disclosure.

In one embodiment, as shown in FIG. 7, a method for data downloading includes the following steps.

Step S702, sending a download request, and sending a security check request according to the download request.

Specifically, a mobile terminal 120 sends to a target server 140 a download request, and sends to a security server 160 a security check request according to the download request.

Step S704, receiving network data returned according to the download request, obtaining a security check result by checking the security of network data according to the security check request, and returning the check request.

Specifically, the mobile terminal 120 receives network data returned from the target server according to the download request. The security server 160 obtains a security check result by checking the security of network data according to the security check request, and returns the check request to the mobile terminal 120.

Step S706, determining whether the check result indicates that the network data is secure; if yes, then perform Step S708, and if no, then perform Step S710.

Step S708, continuing receiving the returned network data.

Step S710, interrupting receiving the returned network data.

Specifically, the mobile terminal 120 determines whether the check result indicates that the network data is secure; if yes, then continue receiving network data returned from the target server 140 according to the download request; and if no, then interrupt receiving network data returned from the target server 140 according to the download request, and send a prompt of whether to receive the returned network data.

The prompt may be text, picture or a combination thereof. The prompt can be displayed on the mobile terminal 120 in the form of a pop-up window, or in a browser window in the form of web content, or displayed in the form of a prompt bar. When displayed in the form of a pop-up window, its suggesting effect is more pronounced. On the other hand, when displayed in the form of a prompt bar, less data information would be needed to obtain through an asynchronous request, rather than sending a synchronization request to the security server, which saves the network resources.

In addition, when receiving a user instruction of continuing receiving the returned network data triggered according to the prompt, the mobile terminal 120 continues receiving the network data returned from the target server 140; when receiving a user instruction of interrupting receiving the returned network data triggered according to the prompt, the mobile terminal 120 interrupts receiving the network data returned from the target server 140.

Using the above method, when downloading network data from a target server by a mobile terminal, it is necessary to perform security check to the network data by a security server. If the network data is secure, then the mobile terminal continues receiving network data returned according to the download request; and if the network data is insecure, then the mobile terminal interrupts receiving network data returned according to the download request. This improves the security of data download.

In one embodiment, the proxy server firstly downloads from a target server the corresponding network data, and then the proxy server, in place of the mobile terminal, sends a security check request to the security server. The proxy server downloads the network data from the target from the server. When the network data is secure, the mobile terminal then downloads from the proxy server the network data. As a result, the risk of insecurity on the mobile terminal is reduced.

Step S702 includes: sending, by the mobile terminal 120, a download request to the proxy server 130; sending, by the proxy server 130, a security check request to the security server 160 according to the download request.

Step S704 includes: receiving, by the proxy server 130, network data returned from the target server 140 according to the download request; checking, by the security server 160, the security of the network data according to the security check request, and returning the check result to the proxy server 130; sending, by the proxy server 130, the check result to the mobile terminal 120.

Step S706 includes: determine, by the mobile terminal 120, whether the check result indicates that the network data is secure; if yes, then continue receiving, by the proxy server 130, network data returned from the target server 140; and if no, then interrupt receiving, by the proxy server 130, network data returned from the target server 140.

Further, in other embodiments, the mobile terminal 120 may also send the download request to the proxy server 130, and send the security check request to the security server 160 according to the download request. The security server 160 checks the security of the network data according to the security check request, and returns the check result to the mobile terminal 120.

In one embodiment, the mobile terminal sends a download request and a security check request to the security server.

Step S702 includes: the mobile terminal 120 sends a download request to the security server 160, and sends a security check request to the security server 160 according to the download request.

Step S704 includes: the secure server 160 receives network data returned from the target server 140, performs security check to the network data according to the security check request and returns the check result to the mobile terminal 120.

Step S706 includes: the mobile terminal 120 determines whether the check result indicates that the network data is secure; if yes, then the security server 160 continues receiving network data returned from the target server 140; and if no, then security server 160 interrupts receiving network data returned from the target server 140.

Figure 8:
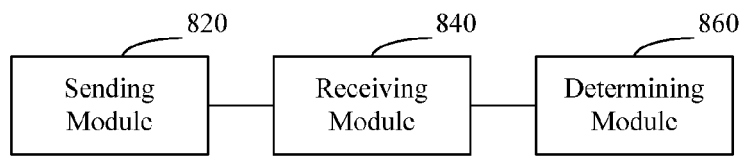
FIG. 8 is a structural schematic diagram showing a device for data downloading according to an embodiment of the present disclosure.

FIG. 8 is a structural schematic diagram showing a device for data downloading according to an embodiment of the present disclosure. The device is implemented on a mobile terminal. The device includes a sending module 820, a receiving module 840 and a determining module 860.

The sending module 820 is configured to send a download request, and send a security check request according to the download request.

Specifically, when a user opens a browser in the mobile terminal, the mobile terminal may receive a trigger to the download link address in the browser. The sending module 820 sends a download request to the target server 140, and sends a security check request to the security server 160 at the time of sending the download request. The security check request may contain a link address for downloading the network data.

The receiving module 840 is configured to receive the network data returned according to the download request, and receive a check result returned according to the security check request.

Specifically, the receiving module 840 may receive a portion of the network data returned from the target server 140 according to the download request. The security server 160 requests the target server for network data corresponding to the link according to the security check request, and performs security check to the network data to obtain a corresponding check result. The check result can be that the network data is secure or insecure. Secure network data means that there is no virus in the network. The receiving module 840 receives the returned check result.

The determining module 860 is configured to determine whether the check result indicates that the network data is secure.

Specifically, the determining module 860 is further configured to determine whether the content in a predetermined position of the check result packet indicates that the network data is secure. In the check result packet, the content in a predetermined position can be set as indicating whether the network data is secure, such as content set in the head or tail position of a packet indicating whether the network data is secure.

The receiving module 840 is also configured to, when the check result is determined as that the check result indicates that the network data is secure, continue receiving network data returned according to the download request, and the check result is determined as that the network data is insecure, interrupt receiving network data returned according to the download request, and send a prompt of whether to receive the returned network data.

The prompt may be text, picture or a combination thereof. The prompt can be displayed on the mobile terminal in the form of a pop-up window, or in a browser window in the form of web content, or displayed in the form of a prompt bar. When displayed in the form of a pop-up window, its suggesting effect is more pronounced. On the other hand, when displayed in the form of a prompt bar, less data information would be needed to obtain through an asynchronous request, rather than sending a synchronization request to the security server, which saves the network resources.

The receiving module 840 is further configured to, when receiving a user instruction of continuing receiving the returned network data triggered according to the prompt, continue receiving the network data returned from the target server 140, and receiving a user instruction of interrupting receiving the returned network data triggered according to the prompt, interrupt receiving the network data returned from the target server.

When downloading network data using the above device, it is necessary to perform security check to the network data. If the network data is secure, then continue receiving network data returned according to the download request; and if the network data is insecure, then do not receive network data returned according to the download request. This improves the security of data download. Upon the prompt, whether to receive the returned network data is determined based on the user selection, which is more flexible.

Furthermore, in an embodiment, the sending module 820 is further configured to send to a proxy server a download request. The proxy server 130 then sends a security check request according to the download request. The receiving module 840 is further configured to receive, from the proxy server 130, network data returned from the target server 140 according to the download request, and receive the check result returned by the proxy server 130. The determining module 860 is further configured to determine whether the check result indicates that the network data is secure; if yes, then the receiving module 840 is further configured to continue receiving, by the proxy server 130, network data returned from the target server 140 according to the download request; and if no, then the receiving module 840 is further configured to interrupt receiving, by the proxy server 130, network data returned from the target server 140 according to the download request, and send a prompt of whether to receive the returned network data.

Specifically, the sending module 820 is further configured to send to the proxy server a download request. The proxy server 130 then sends a security check request to the security server 160 according to the download request. The receiving module 840 is further configured to receive the check result obtained by the security server 160 according to the security check request and returned by the proxy server 130.

The above device for data downloading adopts the way of downloading the corresponding network data from a target server using a proxy server, then sending a security check request to the security server by the proxy server in place of the mobile terminal, and then downloading network data from the proxy server by the mobile terminal. As a result, the risk of insecurity on the mobile terminal is reduced.

Furthermore, in an embodiment, the sending module 820 is further configured to send to the proxy server 130 a download request, and sends to the security server 160 a security check request according to the download request. The receiving module 840 is further configured to receive, from the proxy server 130, network data returned from the target server 140 according to the download request, and receive the check result returned by the security server 160 according to the security check request. The determining module 860 is further configured to determine whether the check result indicates that the network data is secure; if yes, then the receiving module 840 is also configured to continue receiving, by the proxy server 130, network data returned from the target server 140 according to the download request; and if no, then the receiving module 840 is also configured to interrupt receiving, by the proxy server 130, network data returned from the target server 140 according to the download request, and send a prompt of whether to receive the returned network data.

With the above device, the download request is sent by the proxy server, and the network data is received also by the proxy server. This ensures the security of downloading network data by the mobile terminal. On the other hand, the security check request is sent by the mobile terminal, and the check result is returned by the security server directly to the mobile terminal. This reduces the intermediate transit links, saving time and network resources.

Furthermore, in an embodiment, the sending module 820 is further configured to send to the security server a download request, and sends to the security server a security check request according to the download request. The receiving module 840 is further configured to receive, from the security server 160, network data returned from the target server 140 according to the download request, and receive the check result returned upon sending the security check request from the security server. The determining module 860 is further configured to determine whether the check result indicates that the network data is secure; if yes, then the receiving module 840 is also configured to continue receiving, by the security server 160, network data returned from the target server 140 according to the download request; and if no, then the receiving module 840 is also configured to interrupt receiving, by the security server 160, network data returned from the target server 140 according to the download request, and send a prompt of whether to receive the returned network data. The function of the security server and the proxy server is performed by the security server, which saves the hardware and reduces the cost thereby.

It should be noted that for a person skilled in the art, partial or full process to realize the methods in the above embodiments can be accomplished by related hardware instructed by a computer program, the program can be stored in a computer readable storage medium and the program can include the process of the embodiments of the above methods. Wherein, the storage medium can be a disk, a light disk, a Read-Only Memory or a Random Access Memory, etc.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The invention claimed is:

1. A method for data downloading, comprising:
    sending, by a mobile terminal, a download request to a target server, and sending, by the mobile terminal, a security check request to a security server according to the download request;
    receiving, by the mobile terminal, network data from the target server returned according to the download request, and receiving, by the mobile terminal, a check result from the security server returned according to the security check request; and
    determining, by the mobile terminal, whether the check result indicates that the network data from the target server is secure; if yes, then continue receiving, by the mobile terminal, the network data from the target server, and if no, interrupt, by the mobile terminal, receiving the network data from the target server.

2. The method of claim 1,
    wherein the sending further comprises:
        sending to a proxy server the download request, and sending, by the proxy server, the security check request according to the download request;
    wherein the receiving further comprises:
        receiving, by the proxy server, network data from the target server according to the download request, and receiving, by the proxy server, the check result; and
    wherein the determining further comprises:
        determining whether the check result indicates that the network data is secure; if yes, then continue receiving, by the proxy server, network data from the target server; and if no, then interrupt receiving, by the proxy server, network data from the target server.

3. The method of claim 1,
    wherein the sending further comprises:
        sending to a proxy server the download request;
    wherein the receiving further comprises:
        receiving, by the proxy server, network data from the target server according to the download request; and
    wherein the determining further comprises:
        determining whether the check result indicates that the network data is secure; if yes, then continue receiving, by the proxy server, network data from the target server; and if no, then interrupt receiving, by the proxy server, network data from the target server.

4. The method of claim 1,
    wherein the sending further comprises:
        sending to the security server the download request;
    wherein the receiving further comprises:
        receiving, by the security server, network data from the target server according to the download request; and wherein the determining further comprises:
  determining whether the check result indicates that the network data is secure; if yes, then continue receiving, by the security server, network data from the target server; and if no, then interrupt receiving, by the security server, network data from the target server.

5. The method of claim 1, wherein the determining further comprises:
  determining whether content in a predetermined position of the check result packet indicates that the network data is secure.

6. A method for data downloading, comprising:
  sending, by a mobile terminal, a download request to a target server, and sending, by the mobile terminal, a security check request to a security server according to the download request;
  receiving, by the mobile terminal, network data from the target server according to the download request, checking, by the security server, the security of the network data according to the security check request to obtain a check result, and returning, by the security server, the check result to the mobile terminal; and
  determining, by the mobile terminal, whether the check result indicates that the network data is secure; if yes, then continue receiving, by the mobile terminal, the network data from the target server, and if no, interrupt, by the mobile terminal, receiving the network data from the target server.

7. The method of claim 6,
wherein the sending further comprises:
  sending, by the mobile terminal, the download request to a proxy server; and
  sending, by the proxy server, the security check request to the security server according to the download request;
wherein the receiving further comprises:
  receiving, by the proxy server, network data from the target server according to the download request, checking, by the security server, the security of the network data according to the security check request to obtain the check result, and returning the check result to the proxy server; and sending, by the proxy server, the check result to the mobile terminal;
wherein the determining further comprises:
  determining, by the mobile terminal, whether the check result indicates that the network data is secure; if yes, then continue receiving, by the proxy server, network data from the target server; and if no, then interrupt receiving, by the proxy server, network data from the target server.

8. The method of claim 6,
wherein the sending further comprises:
  sending, by the mobile terminal, the download request to a proxy server;
wherein the receiving further comprises:
  receiving, by the proxy server, network data from the target server according to the download request, and checking, by the security server, the security of the network data according to the security check request to obtain the check result, and returning the check result to the mobile terminal;
wherein the determining further comprises:
  determining whether the check result indicates that the network data is secure; if yes, then continue receiving, by the proxy server, network data from the target server; and if no, then interrupt receiving, by the proxy server, network data from the target server.

9. The method of claim 6,
wherein the sending further comprises:
  sending, by the mobile terminal, the download request to the security server;
wherein the receiving further comprises:
  receiving, by the security server, network data from the target server according to the download request, and checking, by the security server, the security of the network data according to the security check request to obtain the check result, and returning the check result to the mobile terminal;
wherein the determining further comprises:
  determining whether the check result indicates that the network data is secure; if yes, then continue receiving, by the security server, network data from the target server; and if no, then interrupt receiving, by the security server, network data from the target server.

10. A device for data downloading, comprising:
one or more computer processors;
a memory; and
one or more programs, wherein the one or more programs are stored in the memory and configured to be executed by the one or more computer processors, the one or more programs including instructions for:
  sending, by a mobile terminal, a download request to a target server, and sending, by the mobile terminal, a security check request to a security server according to the download request;
  receiving, by the mobile terminal, network data from the target server according to the download request, and receiving, by the mobile terminal, a check result from the security server according to the security check request;
  determining, by the mobile terminal, whether the check result indicates that the network data from the target server is secure;
  when the check result indicates that the network data is secure, continuing to receive, by the mobile terminal, network data from the target server; and
  when the check result indicates that the network data is insecure, interrupting, by the mobile terminal, receiving the network data from the target server.

11. The device of claim 10, wherein the one or more programs further include instructions for:
  sending to a proxy server the download request, and sending, by the proxy server, the security check request according to the download request;
  receiving, by the proxy server, network data from the target server according to the download request, and receiving the check result with the proxy server; and
  determining whether the check result indicates that the network data is secure;
  when determining that the check result indicates that the network data is secure, continuing to receive, by the proxy server, network data returned from the target server, and
  when determining that the check result indicates that the network data is insecure, interrupting receiving, by the proxy server, network data returned from the target server.

12. The device of claim 10, wherein the one or more programs further include instructions for:
  sending to a proxy server the download request;

receiving, by the proxy server, network data from the target server according to the download request; and determining whether the check result indicates that the network data is secure;

when determining that the check result indicates that the network data is secure, continuing to receive, by the proxy server, network data returned from the target server, and when determining that the check result indicates that the network data is insecure, interrupting receiving, by the proxy server, network data returned from the target server.

13. The device of claim 10, wherein the one or more programs further include instructions for:

sending to the security server the download request;

receiving, by the security server, network data from the target server; and determining whether the check result indicates that the network data is secure, wherein:

when determining that the check result indicates that the network data is secure, continuing to receive, by the security server, network data returned from the target server, and when determining that the check result indicates that the network data is insecure, interrupting receiving, by the security server, network data returned from the target server.

14. The device of claim 10, wherein the one or more programs further include instructions for determining whether a content in a predetermined position of the check result packet indicates that the network data is secure.

15. A system for data downloading, comprising a mobile terminal, a security server, and a target server, wherein the mobile terminal is configured to send to the target server a download request, and to send to the security server a security check request according to the download request, and to receive from the target server network data according to the download request, wherein the security server is configured to check the security of the network data according to the security check request to obtain a check result, and to return the check result to the mobile terminal, and the mobile terminal is further configured to, when the check result indicates that the network data is secure, continue receiving network data returned from the target server, and when the check result indicates that the network data is insecure, interrupt receiving network data returned from the target server.

16. The system of claim 15, wherein the system further comprises a proxy server, wherein the mobile terminal is further configured to send the download request to the proxy server, wherein the proxy server is configured to receive network data from the target server according to the download request, to send the security check request to the security server according to the download request, to receive the check result sent by the security server and to send the check result to the mobile terminal, wherein the mobile terminal is further configured to determine whether the check result indicates that the network data is secure, and when determining that the check result indicates that the network data is secure, the proxy server continues receiving network data returned from the target server, and when determining that the check result indicates that the network data is insecure, the proxy server interrupts receiving network data returned from the target server.

17. The system of claim 15, wherein the system further comprises a proxy server, wherein the mobile terminal is further configured to send the download request to the proxy server, and to send the security check request to the security server according to the download request, wherein the proxy server is configured to receive network data from the target server according to the download request, wherein the mobile terminal is further configured to receive the check result from the security server according to the security check result, and to determine whether the check result indicates that the network data is secure, and the proxy server is further configured to, when the mobile terminal determines that the check result indicates that the network data is secure, continue receiving network data returned from the target server, and when the mobile terminal determines that the check result indicates that the network data is insecure, interrupt receiving network data returned from the target server.

18. The system of claim 15, wherein the mobile terminal is further configured to send the download request to the security server, to send the security check request to the security server according to the download request, to receive the check result according to the security check request, and to determine whether the check result indicates that the network data is secure, wherein the security server is configured to receive the network data from the target server according to the download request, and the security server is further configured to, when the mobile terminal determines that the check result indicates that the network data is secure, continue receiving network data returned from the target server, and when the mobile terminal determines that the check result indicates that the network data is insecure, interrupt receiving network data returned from the target server.

19. The system of claim 15, wherein the mobile terminal is further configured to determine whether a content in a predetermined position of the check result packet indicates that the network data is secure.

* * * * *